C. Peters.
Melting and Decarbonizing Iron.
Nº 96,479. Patented Nov. 2, 1869.

Witnesses:
Gustave Dieterich
Jno. F. Brooks

Inventor:
C. Peters
per Munn & Co.
Attys.

UNITED STATES PATENT OFFICE.

CHARLES PETERS, OF TRENTON, NEW JERSEY.

IMPROVEMENT IN MELTING AND DECARBONIZING IRON.

Specification forming part of Letters Patent No. 96,479, dated November 2, 1869.

*To all whom it may concern:*

Be it known that I, CHARLES PETERS, of Trenton, in the county of Mercer and State of New Jersey, have invented a new and useful Improvement in Furnaces for Melting and Decarbonizing Iron; and I do hereby declare that the following is a full, clear, and exact description thereof, which will enable others skilled in the art to make and use the same, reference being had to the accompanying drawings, forming part of this specification.

This invention relates to a new and useful improvement in melting, decarbonizing, and desulphurizing iron; and it consists in melting the iron at the top of the stack or cupola and dropping the melted iron through a column of flame and onto a solid cone or bed, whereby the globules of iron are burst, and in supplying oxygen or atmospheric air to the iron on or near the cone or bed, and in so arranging the furnace that the surplus heat may be utilized for generating steam or other purposes, as will be hereinafter more fully described.

Figure 1:
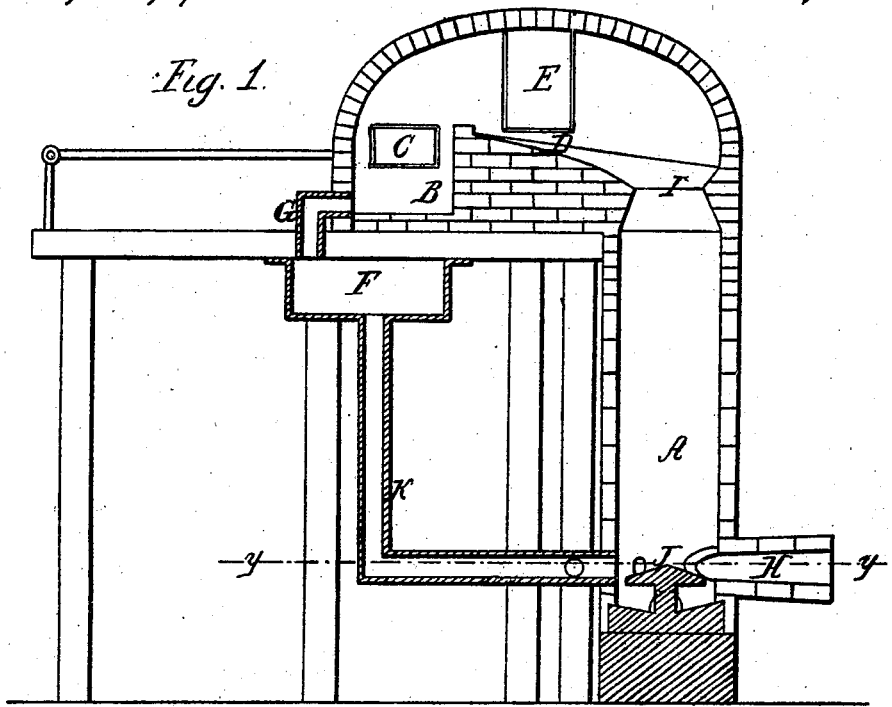
Figure 2:
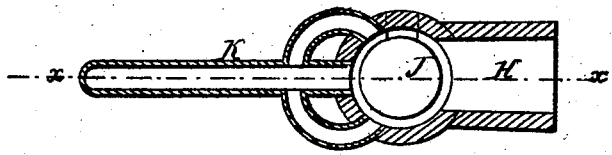

In the accompanying drawings, Figure 1 represents a sectional elevation of the furnace in the section, being through the line $x\,x$ of Fig. 2. Fig. 2 is a horizontal section through the line $y\,y$ of Fig. 1.

Similar letters of reference indicate corresponding parts.

A is the stack or cupola, which is closed at the top.

B is the fire-box, into which the fuel is introduced through the door C.

The iron to be melted is laid on the bed D, and is introduced through the door E.

F is an air-chamber, into which the blast is forced by any suitable blowing apparatus.

G is a tuyere, (two or more may be used,) through which the fuel is supplied with air.

The blast and products of combustion are forced in contact with the iron on the bed D, and down through the stack A, and from the furnace through the flue H, from which it may be conveyed to a steam-boiler for generating steam, or to any other point for heating purposes.

It will be noticed that the top of the stack A is somewhat contracted near its upper end, as seen at I. This is for the purpose of retarding the exit of the flame and heat from the melting-chamber, and to render the heat more intense in that chamber.

T (near the bottom of the stack) is a conical formation, supported on a short pedestal from the bottom of the stack, made of some incombustible material. The melted iron will run down on the inclined surface of the bed D, and fall through the stack A, which is filled with the flaming products of combustion, and drop onto the cone T. The concussion thus produced will burst the globules and flatten them. When the iron is in this condition (or in the form of scales) it is met by a blast of air or oxygen from the air-chamber F, (or from any other source,) conveyed through the pipe K, and discharged through one or more tuyeres, as is done in ordinary melting cupola-furnaces. This blast or supply of oxygen is regulated by a suitable damper or valve in the conducting-pipe. This supply of oxygen combining with the particles of iron completely decarbonizes it and also frees it from sulphur and other impurities. The melted iron thus purified settles in the bottom of the stack, from which it is drawn by the ordinary method of tapping. For recarbonizing the iron after being thus purified and converting the iron into steel of a harder character, the bottom of the stack may be formed of charcoal or other equivalent material.

I do not confine myself to the particular details of this arrangement. As shown in the drawings, my invention consists mainly in melting the iron at the top of the stack or cupola and dropping it down through the heated products of combustion and allowing it to impinge upon some hard substance or material which shall burst the globules, and at or near the bursting point to furnish it with an additional supply of oxygen.

Having thus described my invention, I claim as new and desire to secure by Letters Patent—

1. Melting iron at or near the top of the stack or cupola, down through which the blast with the products of combustion is forced, substantially as described.

2. Dropping the melted iron from the melting-bed through the blast and heated products of combustion in the stack or cupola, substantially as described.

3. Dropping the melted iron onto a cone or hard substance for bursting the globules, substantially as described.

4. Furnishing the melted iron, when in the finely-divided state, (caused by bursting of the globules,) with oxygen by means of a blast through pipes or tuyeres, substantially as and for the purposes described.

5. The combination and arrangement of the fire-chamber B, melting-bed D, stack or cupola A, and cone J, substantially as and for the purposes described.

6. The exit-flue H near the bottom of a melting stack or cupola, substantially as shown.

The above specification of my invention signed by me this 17th day of September, 1869

CHARLES PETERS.

Witnesses:
GEO. W. MABEE,
ALEX. F. ROBERTS.